United States Patent
Ke

(10) Patent No.: US 11,403,018 B2
(45) Date of Patent: Aug. 2, 2022

(54) METHOD AND APPARATUS FOR PERFORMING BLOCK MANAGEMENT REGARDING NON-VOLATILE MEMORY

(71) Applicant: Silicon Motion, Inc., Hsinchu County (TW)

(72) Inventor: Kuan-Yu Ke, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 8 days.

(21) Appl. No.: 17/225,080

(22) Filed: Apr. 7, 2021

(65) Prior Publication Data
US 2021/0326042 A1      Oct. 21, 2021

(30) Foreign Application Priority Data
Apr. 15, 2020   (TW) ................................. 109112609

(51) Int. Cl.
G06F 3/06     (2006.01)

(52) U.S. Cl.
CPC ............ G06F 3/064 (2013.01); G06F 3/0604 (2013.01); G06F 3/0679 (2013.01)

(58) Field of Classification Search
CPC ...... G06F 3/064; G06F 3/0604; G06F 3/0679; G06F 3/0652; G06F 3/0616
See application file for complete search history.

(56) References Cited

U.S. PATENT DOCUMENTS

| | | | | |
|---|---|---|---|---|
| 8,738,876 | B2* | 5/2014 | Shen | G06F 12/0246 711/170 |
| 2013/0080689 | A1* | 3/2013 | Jo | G06F 12/0246 711/E12.008 |
| 2013/0311705 | A1* | 11/2013 | Cheng | G06F 12/0246 711/E12.008 |
| 2015/0067239 | A1* | 3/2015 | Chu | G06F 12/0246 711/103 |
| 2019/0179741 | A1* | 6/2019 | Liu | G06F 3/0688 |
| 2020/0183588 | A1* | 6/2020 | Lee | G06F 3/0649 |

FOREIGN PATENT DOCUMENTS

| | | |
|---|---|---|
| TW | 200951722 A1 | 12/2009 |
| TW | 201227740 A1 | 7/2012 |
| TW | 201917581 A  | 5/2019 |
| TW | 201926351 A  | 7/2019 |
| TW | 201944421 A  | 11/2019 |
| TW | 201947600 A  | 12/2019 |

\* cited by examiner

*Primary Examiner* — Francisco A Grullon
(74) *Attorney, Agent, or Firm* — Winston Hsu

(57) ABSTRACT

A method and apparatus for performing block management regarding a non-volatile memory are provided. The method includes: determining whether a first blank block belongs to a cold block group or a hot block group according to an erase count of the first blank block; in response to the first blank block belonging to the cold block group, selecting the first blank block from a plurality of blank blocks as a target block, for performing data writing; according to at least one characteristic parameter regarding first data to be written, determining whether the first data belongs to a cold data group or a hot data group; and in response to the first data belonging to the hot data group, writing the first data into the first blank block to use the first blank block as a data block of the first data.

23 Claims, 7 Drawing Sheets

METHOD AND APPARATUS FOR PERFORMING BLOCK MANAGEMENT REGARDING NON-VOLATILE MEMORY

BACKGROUND OF THE INVENTION

1. Field of the Invention

The present invention is related to memory control, and more particularly, to a method for performing block management regarding a non-volatile (NV) memory and associated apparatus such as a memory device, a memory controller of the memory device, and an electronic device.

2. Description of the Prior Art

In recent years, due to the continuous development of memory technology, various portable or non-portable memory devices (e.g. memory cards respectively conforming to SD/MMC, CF, MS and XD specification; or embedded memory devices respectively conforming to UFS and eMMC specification) are widely implemented in many applications. Therefore, the access control of memories in these memory devices has become a very hot topic.

In terms of commonly used NAND flash memories, they can be mainly divided into two types of flash memory, single level cell (SLC) flash memories and multiple level cell (MLC) flash memories. Each transistor used as a memory cell in an SLC flash memory has only two charge values that are used to respectively represent a logic value of 0 and a logic value of 1. In addition, the storage ability of each transistor used as a memory cell in an MLC flash memory can be fully utilized, and the transistor in the MLC flash memory is driven by a higher voltage, and different voltage levels can be utilized to record at least two sets of bit information (e.g., 00, 01, 11, 10). Theoretically, the recording density of the MLC flash memory can reach at least twice the recording density of the SLC flash memory. This is very good news for NAND flash memory related industries.

Compared with SLC flash memory, MLC flash memory is cheaper and can provide larger capacity in a limited space, so MLC flash memory has quickly become the mainstream of the memory device on the market. However, the problems caused by the instability of the MLC flash memory have also emerged one by one. In order to ensure that the memory device's access control of the flash memory can conform to relevant specifications, the flash memory controller is usually equipped with some management mechanisms to properly manage data access.

According to related technologies, memory devices with the management mechanisms still have shortcomings. For example, a certain data block generated during wear leveling process may have data to be updated and may be used repeatedly, which may cause an erase count of the block to increase rapidly. As a result, the block may become a bad block early, which worsens the overall performance of the memory device. Therefore, a novel method and associated architecture are needed to solve the related technical problems without side effects or with less likelihood of causing side effects.

SUMMARY OF THE INVENTION

It is an objective of the present invention to provide a method for performing block management regarding a non-volatile (NV) memory and associated apparatus such as a memory device, a memory controller of the memory device, and an electronic device, so as to solve the above-mentioned problems.

At least one embodiment of the present invention provides a method for performing block management regarding a NV memory, wherein the method is applied to a controller of a memory device. The memory device may comprise the controller and the NV memory, the NV memory may comprise at least one NV memory element (e.g. one or more NV elements), and the at least one NV memory element may comprise a plurality of blocks. The method may comprise: determining whether a first blank block belongs to a cold block group or a hot block group according to an erase count of the first blank block, wherein the cold block group and the hot block group respectively correspond to a first range of erase counts and a second range of erase counts, and any value in the second range of erase counts is greater than any value in the first range of erase counts; in response to the first blank block belonging to the cold block group, selecting the first blank block from a plurality of blank blocks as a target block, for performing data writing, wherein the plurality of blocks comprise the plurality of blank blocks, and the plurality of blank blocks comprise the first blank block; determining whether first data belongs to a cold data group or a hot data group according to at least one characteristic parameter regarding the first data to be written, wherein the cold data group and the hot data group respectively correspond to a first range of access probability and a second range of access probability, and any value in the second range of access probability is greater than any value in the first range of access probability; and in response to the first data belonging to the hot data group, writing the first data into the first blank block to use the first blank block as a data block of the first data.

In addition to the above method, the present invention also provides a memory device, and the memory device comprises a NV memory and a controller. The NV memory is arranged to store information, wherein the NV memory may comprise at least one non-volatile memory element (such as one or more NV memory elements), and the at least one NV memory element may comprise a plurality of blocks. The controller is coupled to the NV memory, and the controller is arranged to control operations of the memory device. In addition, the controller comprises a processing circuit, wherein the processing circuit is arranged to control the controller according to a plurality of host commands from a host device to allow the host device to access the NV memory through the controller. For example, the controller determines whether a first blank block belongs to a cold block group or a hot block group according to an erase count of the first blank block, wherein the cold block group and the hot block group respectively correspond to a first range of erase counts and a second range of erase counts, and any value in the second range of erase counts is greater than any value in the first range of erase counts; in response to the first blank block belonging to the cold block group, the controller selects the first blank block from a plurality of blank blocks as a target block, for performing data writing, wherein the plurality of blocks comprise the plurality of blank blocks, and the plurality of blank blocks comprise the first blank block; the controller determines whether first data belongs to a cold data group or a hot data group according to at least one characteristic parameter regarding the first data to be written, wherein the cold data group and the hot data group respectively correspond to a first range of access probability and a second range of access probability, and any value in the second range of access probability is greater than any value in the first range of access probability; and in response to the first data belonging to the hot data group, the controller writes the first data into the first blank block to use the first blank block as a data block of the first data.

According to some embodiments, the present invention also provides an associated electronic device. The electronic device may comprise the memory device, and may further comprise: the host device, coupled to the memory device. The host device may comprise: at least one processor for controlling operations of the host device; and a power supply circuit, coupled to the at least one processor, for providing power to the at least one processor and the memory device. In addition, the memory device can provide the host device with storage space.

In addition to the above method, the present invention also provides a controller of a memory device, wherein the memory device comprises the controller and a NV memory. The NV memory may comprise at least one NV memory element (e.g. one or more NV memory elements), and the at least one NV memory element comprises a plurality of blocks. In addition, the controller comprises a processing circuit, wherein the processing circuit is arranged to control the controller according to a plurality of host commands from a host device, so as to allow the host device to access the NV memory through the controller. For example, the controller determines whether a first blank block belongs to a cold block group or a hot block group according to an erase count of the first blank block, wherein the cold block group and the hot block group respectively correspond to a first range of erase counts and a second range of erase counts, and any value in the second range of erase counts is greater than any value in the first range of erase counts; in response to the first blank block belonging to the cold block group, the controller selects the first blank block from a plurality of blank blocks as a target block, for performing data writing, wherein the plurality of blocks comprise the plurality of blank blocks, and the plurality of blank blocks comprise the first blank block; the controller determines whether first data belongs to a cold data group or a hot data group according to at least one characteristic parameter regarding the first data to be written, wherein the cold data group and the hot data group respectively correspond to a first range of access probability and a second range of access probability, and any value in the second range of access probability is greater than any value in the first range of access probability; and in response to the first data belonging to the hot data group, the controller writes the first data into the first blank block to use the first blank block as a data block of the first data.

These and other objectives of the present invention will no doubt become obvious to those of ordinary skill in the art after reading the following detailed description of the preferred embodiment that is illustrated in the various figures and drawings.

DETAILED DESCRIPTION

I. Memory System

Figure 1:
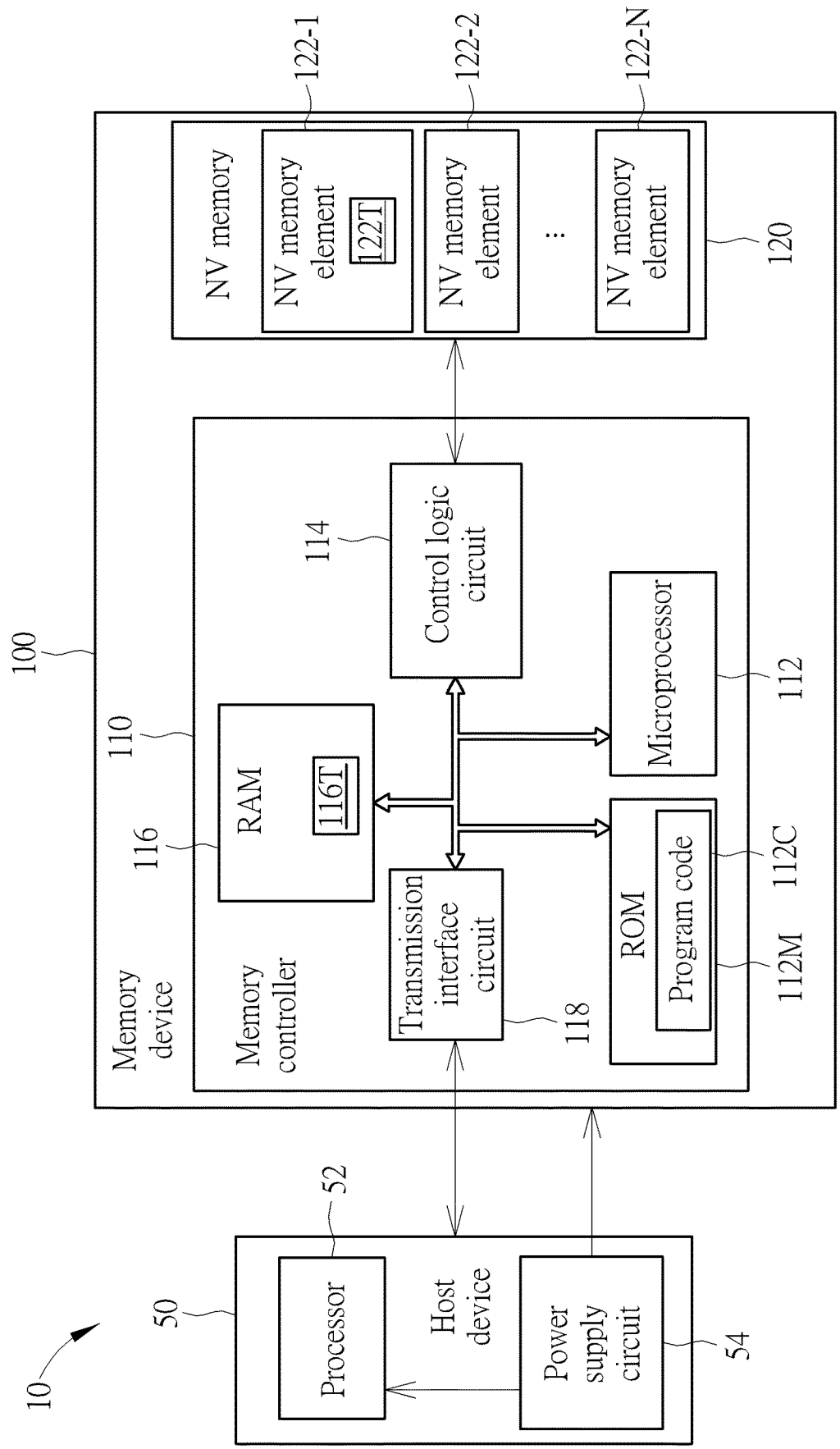
FIG. 1 is a diagram illustrating an electronic device according to an embodiment of the present invention.

FIG. 1 is a diagram illustrating an electronic device 10 according to an embodiment of the present invention, wherein the electronic device 10 may comprise a host device 50 and a memory device 100. The host device 50 may comprise at least one processor (e.g. one or more processors), which may be collectively referred to as a processor 52, and the host device 50 may further comprise a power supply circuit 54, coupled to the processor 52. The processor 52 is arranged to control operations of the host device 50, and the power supply circuit 54 is arranged to provide power to the processor 52 and the memory device 100, and output one or more driving voltages to the memory device 100. The memory device 100 can be arranged to provide the host device 50 with storage space, and the one or more driving voltages can be obtained from the host device 50 to as the power source of the memory device 100. Examples of the host device 50 may comprise (but are not limited to) multifunctional mobile phone, wearable device, tablet, and personal computer such as desktop computer and laptop computer. Examples of the memory device 100 may comprise (but are not limited to) portable memory devices (e.g., memory cards conforming to SD/MMC, CF, MS, or XD specification), solid state drives (SSD), and various embedded memory devices respectively conforming to UFS and EMMC specification. According to the embodiment, the memory device 100 may comprise a controller such as a memory controller 110, and may further comprise a non-volatile (NV) memory 120, wherein the controller is arranged to control operations of the memory device 100 and access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, wherein the symbol "N" can represent a positive integer greater than one. For example, the NV memory 120 may be a flash memory, and the plurality of NV memory elements 122-1, 122-2, . . . , and 122-N may be a plurality of flash memory chips or a plurality of flash memory dies, but the invention is not limited thereto.

As shown in FIG. 1, the memory controller 110 may comprise a processing circuit such as a microprocessor 112, a storage unit such as a read-only memory (ROM) 112M, a control logic circuit 114, a random access memory (RAM) 116, and a transmission interface circuit 118, wherein the above elements can be coupled to each other through a bus. The RAM 116 is implemented by a static random access memory (SRAM), but the invention is not limited thereto. The RAM 116 can be arranged to provide the memory controller 110 with internal storage space. For example, the RAM 116 can be used as a buffer memory to buffer data. In addition, the ROM 112M of the embodiment is arranged to store a program code 112C, and the microprocessor 112 is arranged to execute the program code 112C to control access to the NV memory 120. Please note that, in some examples, the program code 112C can be stored in the RAM 116 or any form of memory. In addition, a data protection circuit (not shown) in the control logic circuit 114 can protect data and/or perform error correction, and the transmission interface circuit 118 can conform to a specific communication specification such as Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification), and can perform communication according to the specific communication specification.

In the embodiment, the host device 50 can access the memory device 100 by sending host commands and corresponding logical addresses to the memory controller 110. The memory controller 110 receives the host commands and the logical addresses, and translates the host commands into memory operation commands (which may be simply called operation commands), and then controls the NV memory with the operation commands to perform reading, writing/programming, etc. on memory units (e.g., data pages) with physical addresses in the NV memory 120, wherein the physical addresses correspond to the logical addresses. When the memory controller 110 performs an erase operation on any NV memory element 122-$n$ among the plurality of NV memory elements 122-1, 122-2, . . . and 122-N (the symbol "n" can represent any integer in the interval [1, N]), at least one of multiple blocks of the NV memory device 122-$n$ will be erased, wherein each block in the multiple blocks can comprise multiple pages (e.g., data pages), and an access operation (e.g., reading or writing) can be performed on one or more pages.

II. System Management Mechanism

According to some embodiments, the processing circuit such as the microprocessor 112 can control the memory controller 110 according to a plurality of host commands from the host device 50, to allow the host device 50 to access the NV memory 120 through the memory controller 110. The memory controller 110 can store data into the NV memory 120 for the host device 50, read the stored data in response to a host command from the host device 50 (e.g. one of the plurality of host commands), and provide the host device 50 with the data read from the NV memory 120. In the NV memory 120 such as a flash memory, the aforementioned at least one NV memory element (e.g. a plurality of NV memory elements 122-1, 122-2, . . . and 122-N) may comprise a plurality of blocks, and the memory controller 110 can be designed to perform dynamic wear leveling process to use the plurality of blocks evenly during any of the various procedures. For example, the proposed dynamic wear leveling process can be used for respectively writing different groups of data into different groups of blocks, to solve related technical problems without side effects or with less likelihood of bringing side effects.

More particularly, the plurality of blocks may comprise a plurality of blank blocks, and the memory controller 110 may perform block classification on the plurality of blank blocks and perform data classification on the data to be written, to selectively perform data writing. The memory controller 110 can record, maintain, and/or update block classification information regarding the block classification and data classification information regarding the data classification in at least one mapping table (e.g. one or more mapping tables) such as a table 116T and a table 122T, to respectively point out different groups of blocks and different groups of data. For example, the memory controller 110 can back up the table 116T to the table 122T in the NV memory 120 (e.g. one or more NV memory elements in the plurality of NV memory elements 122-1, 122-2, . . . and 122-N, such as the NV memory element 122-1). For another example, the memory controller 110 may load at least a portion (e.g., part or all) of the table 122T into the RAM 116 to become the table 116T for quick reference.

Figure 2:
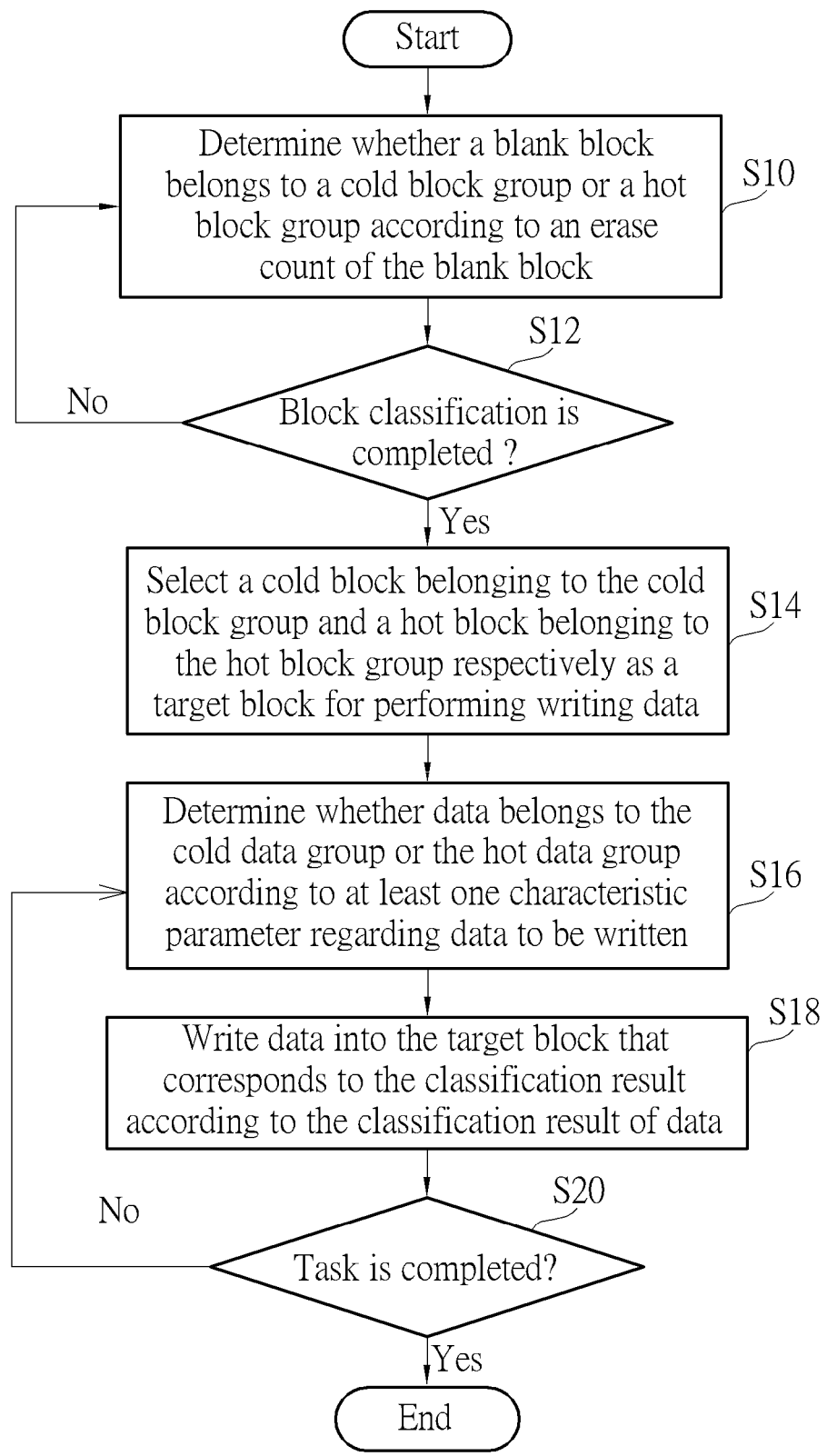
FIG. 2 is a flowchart of a method for performing block management regarding an NV memory according to an embodiment of the present invention.

FIG. 2 is a flowchart illustrating a method for performing block management regarding an NV memory according to an embodiment of the present invention. The method can be applied to the architecture shown in FIG. 1 (e.g. the electronic device 10, the memory device 100, the memory controller 110, etc.), and can be executed by the memory controller 110 of the memory device 100.

In step S10, regarding any blank block in the plurality of blank blocks, the memory controller 110 determines whether the blank block belongs to a cold block group or a hot block group according to an erase count of the blank block, wherein the cold block group and the hot block group respectively correspond to a first range of erase counts and a second range of erase counts, and any value in the second range of erase counts is greater than any value in the first range of erase counts. For better comprehension, it is assumed that an average erase count of the blank blocks is equal to 999, and the first range of erase counts and the second range of erase counts are respectively equal to the interval [0, 999] and [1000, 10000], but the invention is not limited thereto. In some embodiments, the average erase count, the first range of erase counts, and the second range of erase counts can be changed. In addition, the plurality of blank blocks may comprise a first blank block and a second blank block. For example, when the erase count of the first blank block falls within the first range of erase counts such as the interval [0, 999], the memory controller 110 may determine that the first blank block belongs to the cold block group. For another example, when the erase count of the second blank block falls within the second range of erase counts such as the interval [1000, 10000], the memory controller 110 may determine that the second blank block belongs to the hot block group.

In step S12, the memory controller 110 determines whether the block classification of the plurality of blank blocks regarding the cold or hot block group is completed. If yes, step S14 is entered; if no, step S10 is entered, to continue the block classification. Taking the data classification and write control scheme shown in FIG. 3 as an example, after the block classification is completed, the cold block group may comprise one or more cold blocks 312C such as a block 314C, and the hot block group may comprise one or more hot blocks 312H such as a block 314H. However, the present invention is not limited thereto. In some embodiments, the one or more cold blocks 312C and the one or more hot blocks 312H may respectively comprise multiple blocks {314C} and multiple blocks {314H}.

In step S14, the memory controller 110 respectively selects one or more cold blocks 312C belonging to the cold block group and one or more hot blocks 312H belonging to the hot block group as a target block 310 for performing writing data. For example, in response to the first blank block (e.g., block 314C) belonging to the cold block group, the memory controller 110 selects the first blank block from the plurality of blank blocks as a target block for performing data writing, wherein the first blank block can be used as an example of the cold block. For another example, in response to the second blank block (e.g., block 314H) belonging to the hot block group, the memory controller 110 selects the second blank block as another target block from the plurality of blank blocks for performing data writing, wherein the second blank block can be used as an example of the hot block.

In step S16, the memory controller 110 determines whether the data belongs to a cold data group such as a cold data DATA_C or a hot data group such as a hot data DATA_H according to at least one characteristic parameter regarding the data to be written, to generate a classification result of the data for indicating that the data belongs to the cold data group or the hot data group, wherein the cold data group and the hot data group respectively correspond to a first range of access probability and a second range of access probability, and any value in the second range of access probability is greater than any value in the first range of access probability. According to the embodiment, a series of access probability for accessing a series of data at a series of logical addresses {L_ADD} can be regarded as the respective access probability of the series of logical addresses {L_ADD}, and the average value of these access probability can be called an average access probability of the series of logical addresses {L_ADD}. The memory controller 110 can perform statistics on the characteristic parameters regarding the series of logical addresses {L_ADD} and/or the series of data through, for example, a pre-processing manner or an online processing manner, to obtain the respective access probability of the series of logical addresses {L_ADD} for respectively determining whether multiple sets of data to be written belong to the cold data group or the hot data group. For better comprehension, it is assumed that the average access probability is equal to 0.5, and the first range of access probability and the second range of access probability are respectively equal to the intervals [0, 0.499] and [0.500, 1.000]. However, the present invention is not limited thereto. In some embodiments, the average access probability, the first range of access probability, and the second range of access probability can be changed. In addition, the multiple sets of data to be written may comprise a first set of data and a second set of data, such as a first data to be written and a second data to be written, respectively. For example, in the case that the data in step S16 represents the first data, when the access probability regarding the first data falls within the second range of access probability such as the interval [0.500, 1.000], the memory controller 110 can determine that the first data belongs to the hot data group. For another example, in the case that the data in step S16 represents the second data, when the access probability regarding the second data falls within the first range of access probability such as the interval [0, 0.499], the memory controller 110 can determine that the second data belongs to the cold data group.

In step S18, according to the classification result of the data (i.e., the data described in step S16), the memory controller 110 writes the data into the target block of the multiple target blocks that corresponds to the classification result. For example, in response to the first data belonging to the hot data group such as the hot data shown in FIG. 3, the memory controller 110 writes the first data into the first blank block such as the block 314C, to use the first blank block as the data block of the first data. For another example, in response to the second data belonging to the cold data group such as the cold data shown in FIG. 3, the memory controller 110 writes the second data into the second blank block such as the block 314H, to use the second blank block as the data block of the second data.

In step S20, the memory controller 110 determines whether the task of data writing is completed. If yes, the workflow shown in FIG. 2 ends; if no, step S16 is entered to continue the above-mentioned task. Therefore, the loop comprising steps S16 to S20 can respectively store data belonging to different data groups into blocks belonging to different block groups. For example, the memory controller 110 can determine whether other data belongs to the cold data group or the hot data group according to at least one characteristic parameter regarding the other data, and can write the other data into the first blank block in response to the other data belonging to the hot data group, to use the first blank block as the data block of the other data. For another example, the memory controller 110 can determine whether other data belongs to the cold data group or the hot data group according to at least one characteristic parameter regarding the other data, and can write the other data into the second blank block in response to the other data belonging to the cold data group, to use the second blank block as the data block of the other data.

For better comprehension, the method can be illustrated by the workflow shown in FIG. 2, but the present invention is not limited thereto. According to some embodiments, one or more steps can be added to, deleted from, or modified in the workflow shown in FIG. 2.

According to some embodiments, the memory controller 110 may record, maintain, and/or update the relationship between a logical address L_ADD and an access count AC in the above-mentioned at least one mapping table, to indicate access probability of the logical address L_ADD. For example, the memory controller 110 can calculate an average value AC_avg of respective access counts {AC} of all logical addresses {L_ADD}, and can determine that the access probability of the logical address L_ADD is equal to (AC/AC_avg). However, the present invention is not limited thereto. Regarding the data in step S16, the memory controller 110 can determine whether the access probability of the logical address L_ADD reaches the average access probability such as 0.5 according to whether the access count AC of the logical address L_ADD reaches (e.g. greater than or equal to) the average value AC_avg, wherein the access count AC of the logical address L_ADD of the data can be used as an example of the aforementioned at least one characteristic parameter of the data. If the access count AC of the logical address L_ADD reaches (e.g. greater than or equal to) the average value AC_avg, the memory controller 110 can determine that the access probability of the logical address L_ADD reaches the average access probability, which can indicate that the access probability of the data falls within the second range of access probability such as the interval [0.500, 1.000]. Therefore, the memory controller 110 can determine that the data belongs to the hot data group. Otherwise, the memory controller 110 can determine that the access probability of the logical address L_ADD does not reach the average access probability, which can indicate that the access probability of the data falls within the first range of access probability such as the interval [0, 0.499]. Therefore, the memory controller 110 can determine that the data belongs to the cold data group.

According to some embodiments, the memory controller 110 can record, maintain, and/or update a mapping relationship between a logical address L_ADD and a physical address (BLK #, PG #) in at least one logical-to-physical address mapping table (which is called L2P table for short), wherein the physical address (BLK #, PG #) can comprise a block number BLK # and a page number PG #. In addition, the at least one mapping table may comprise the at least one L2P table, and more particularly, may be integrated into the at least one L2P table. The memory controller 110 may record at least a portion (e.g. part or all) of the block classification information and the data classification information in the at least one L2P table. For example, the relationship between the logical address L_ADD and the access count AC is recorded, maintained, and/or updated in the at least one L2P table, to indicate the access probability of the logical address L_ADD, wherein the table 122T can be implemented as a global L2P table, and the table 116T can be implemented as a local L2P table, which can be regarded as a subset of the global L2P table, but the invention is not limited thereto.

Figure 3:
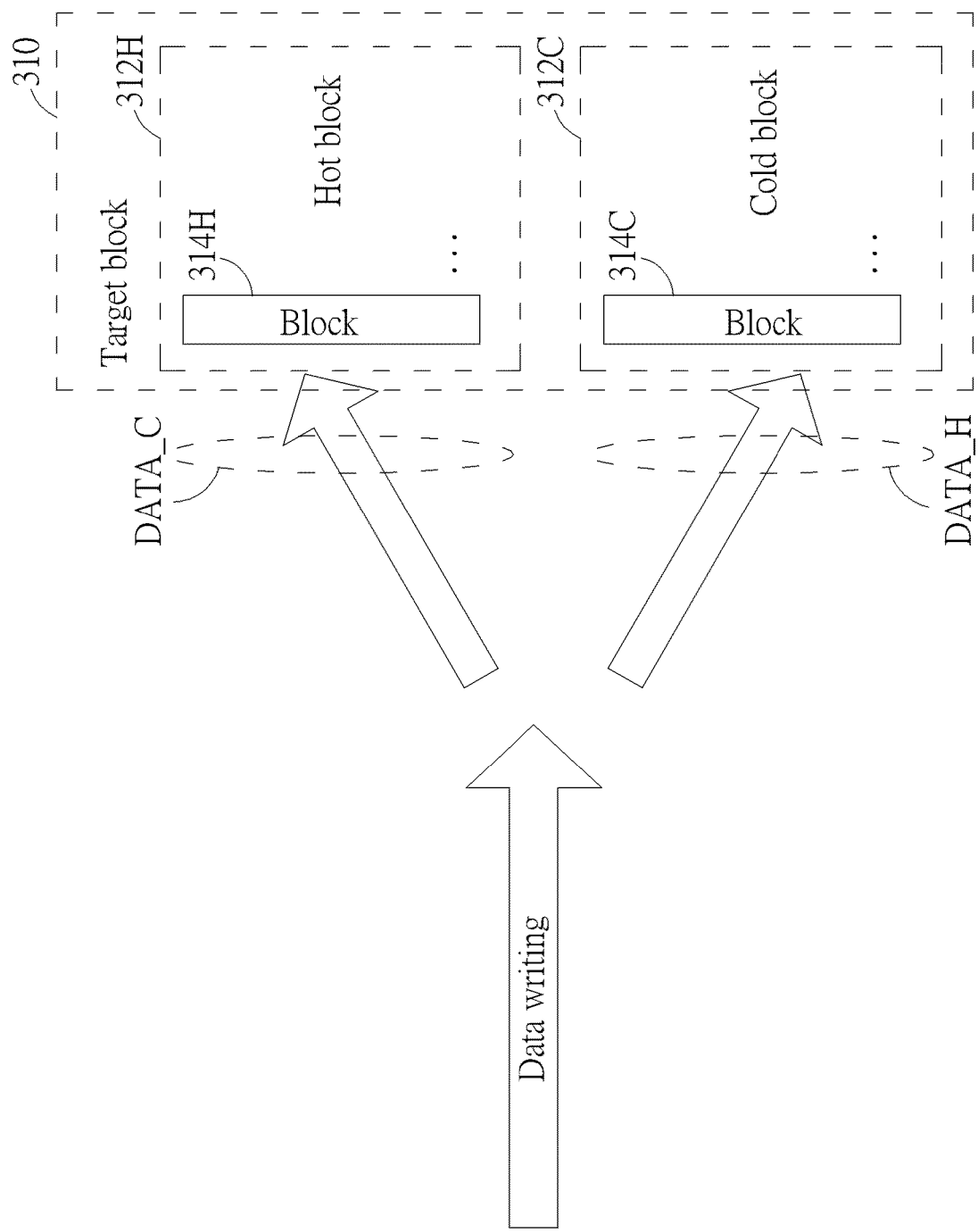
FIG. 3 is a diagram illustrating a data classification and write control scheme of the method shown in FIG. 2 according to an embodiment of the present invention.
Figure 4:
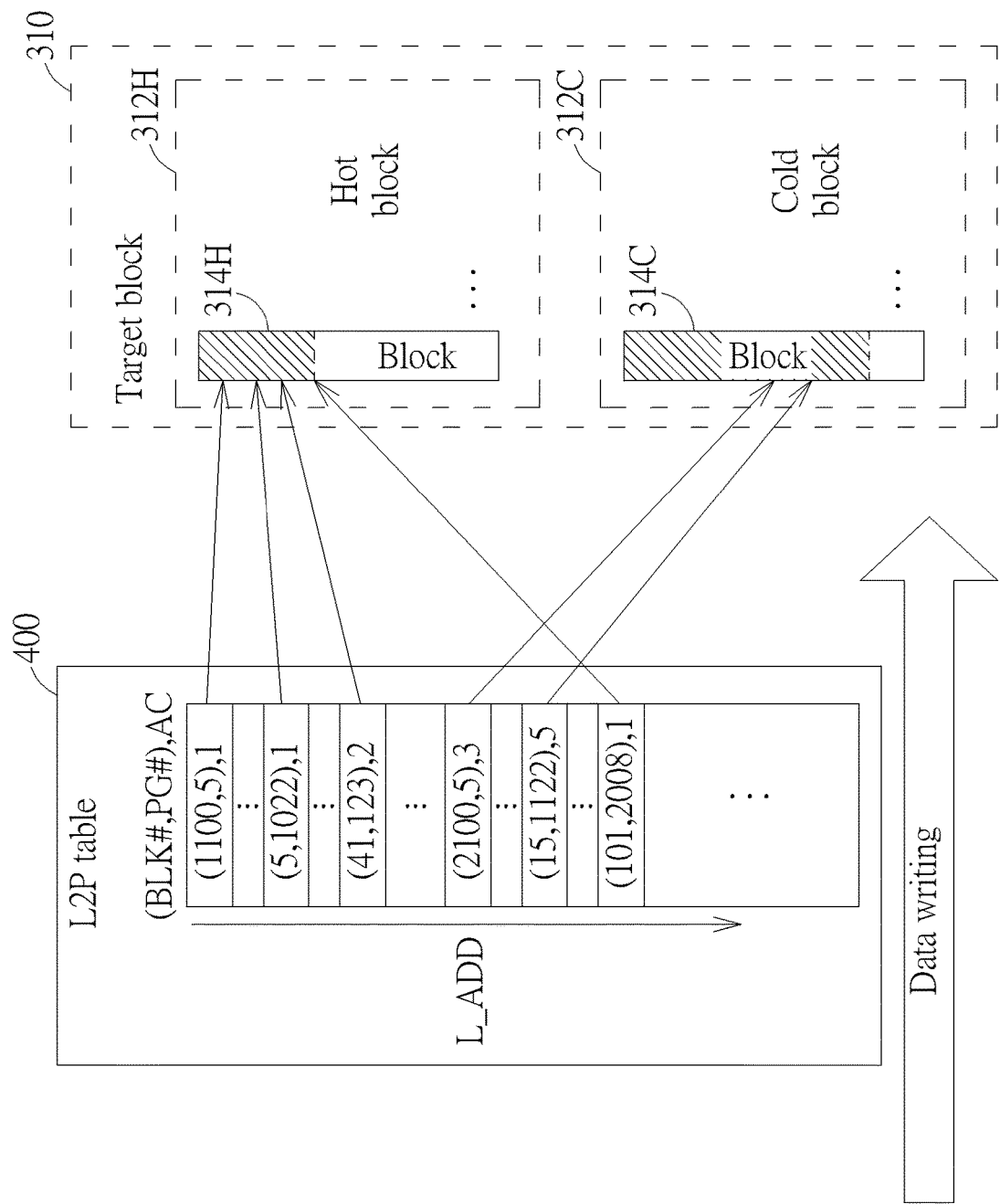
FIG. 4 is a diagram illustrating the implementation details of the data classification and write control scheme shown in FIG. 3 according to an embodiment of the present invention.

FIG. 4 illustrates the implementation details of the data classification and write control scheme shown in FIG. 3 according to an embodiment of the present invention. An L2P table 400 can be used as an example of the aforementioned at least one L2P table, and can be used as an example of the aforementioned at least one mapping table. The memory controller 110 can record, maintain, and/or update the relationship between the logical address L_ADD and mixed information {(BLK #, PG #), AC} in the L2P table 400, wherein an index of the L2P table 400 is the logical address L_ADD, and an entry of the L2P table 400 is the mixed information {(BLK #, PG #), AC}, which can comprise the physical address (BLK #, PG #) and the access count AC, but the present invention is not limited thereto. In some embodiments, the L2P table 400 can be changed. For better comprehension, it is assumed that the average value AC_avg is equal to 2.5. When the respective access counts {AC} (e.g., {3, 5}) of certain logical addresses {L_ADD} reach (e.g. greater than or equal to) the average value AC_avg such as 2.5, the memory controller 110 can determine that the access probability of the logical addresses {L_ADD} reaches the average access probability, and therefore can determine that two sets of data to be written in the logical addresses {L_ADD} belong to the hot data group such as the hot data DATA_H. When the respective access counts {AC} (e.g., {1, 1, 2, 1}) of certain logical addresses {L_ADD} do not reach (e.g. less than) the average value AC_avg such as 2.5, the memory controller 110 can determine that the access probability of the logical addresses {L_ADD} does not reach the average access probability, and therefore can determine that four sets of data to be written in the logical address {L_ADD} belong to the cold data group such as the cold data DATA_C.

According to some embodiments, the first data and the second data can be received from the host device 50, and the operation of writing the first data can be performed according to a write command received from the host device 50, and the operation of writing the second data can be performed according to another write command received from the host device 50. After performing step S18, the memory controller 110 can update the L2P table 400 regarding the data in step S18 (e.g. the first data, the second data, etc.). More particularly, the memory controller 110 can update the physical address (BLK #, PG #) corresponding to the logical address L_ADD to the latest storage location of the data, such as the block number BLK # of the target block arranged to write the data and the page number PG # of a certain page within the target block in step S18, for further access of the data, and can increase the access count AC of the logical address L_ADD of the data by a predetermined increment such as 1, for reference in subsequent data classification. For example, regarding a first written data in the first blank block, the memory controller 110 may update the L2P table 400 for further access of the first written data, wherein the first written data comprises the first data. For another example, regarding a second written data in the second blank block, the memory controller 110 may update the L2P table 400 for further access of the second written data, wherein the second written data comprises the second data.

According to some embodiments, the memory controller 110 can simplify at least a portion (e.g. part or all) of the block classification information and the data classification information, and more particularly, can manage (e.g. record, maintain, and/or update) the data classification information according to a set of predetermined intervals. For example, the set of predetermined intervals may be a set of logical address intervals {[0, L_ADD1-1], [L_ADD1, L_ADD2-1], ... } including all logical addresses {L_ADD}, such as address intervals {[0, 15], [16, 31], ... }, wherein any logical address L_ADD of the logical addresses {L_ADD} can correspond to a data length of 4 KB (kilobytes), and each address interval of the address intervals {[0, 15], [16, 31], ... } can correspond to a data length of 64 KB (e.g. (4*16)=64). However, the present invention is not limited thereto. In some embodiments, the set of predetermined intervals and the data length corresponding to any logical address L_ADD can be changed.

Figure 5:
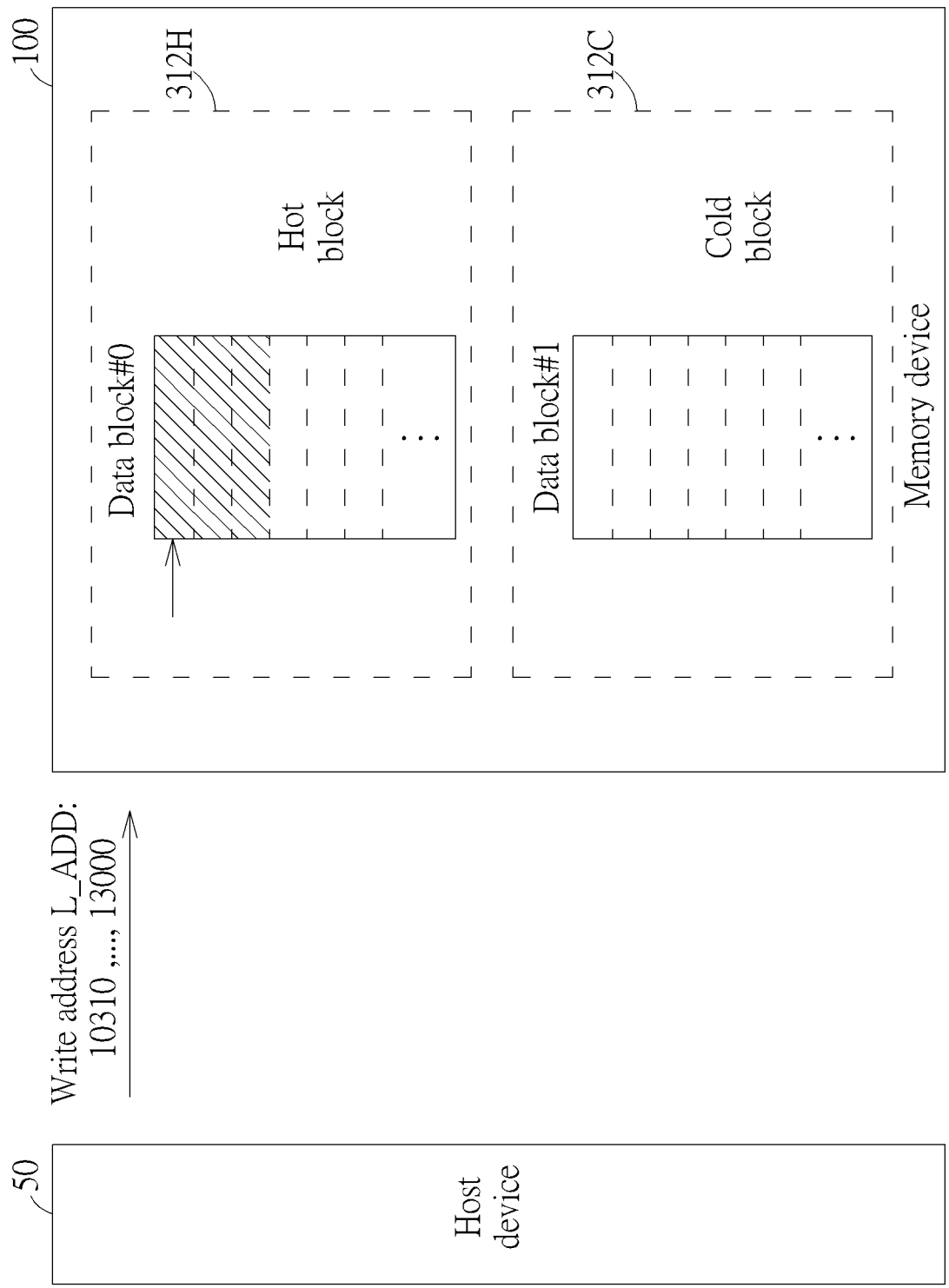
FIG. 5 is a diagram illustrating an example of writing cold data into one or more hot blocks.

FIG. 5 illustrates an example of writing cold data into one or more hot blocks 312H. It is assumed that the write address (e.g., the logical address L_ADD) comprises a set of logical addresses {10310, ... , 13000}. The memory controller 110 determines that a set of data to be written in the set of logical addresses {10310, ... , 13000} belongs to the cold data group (or cold data) according to the data classification information (e.g. the respective access counts {AC}, the average value AC_avg, etc. of the set of logical addresses {10310, ... , 13000}). The set of data can be used as an example of the second data. In response to the second data belonging to the cold data group such as the cold data shown in FIG. 3, the memory controller 110 writes the second data into the second blank block such as the block 314H, to use the second blank block as a data block of the second data, such as a data block #0.

Figure 6:
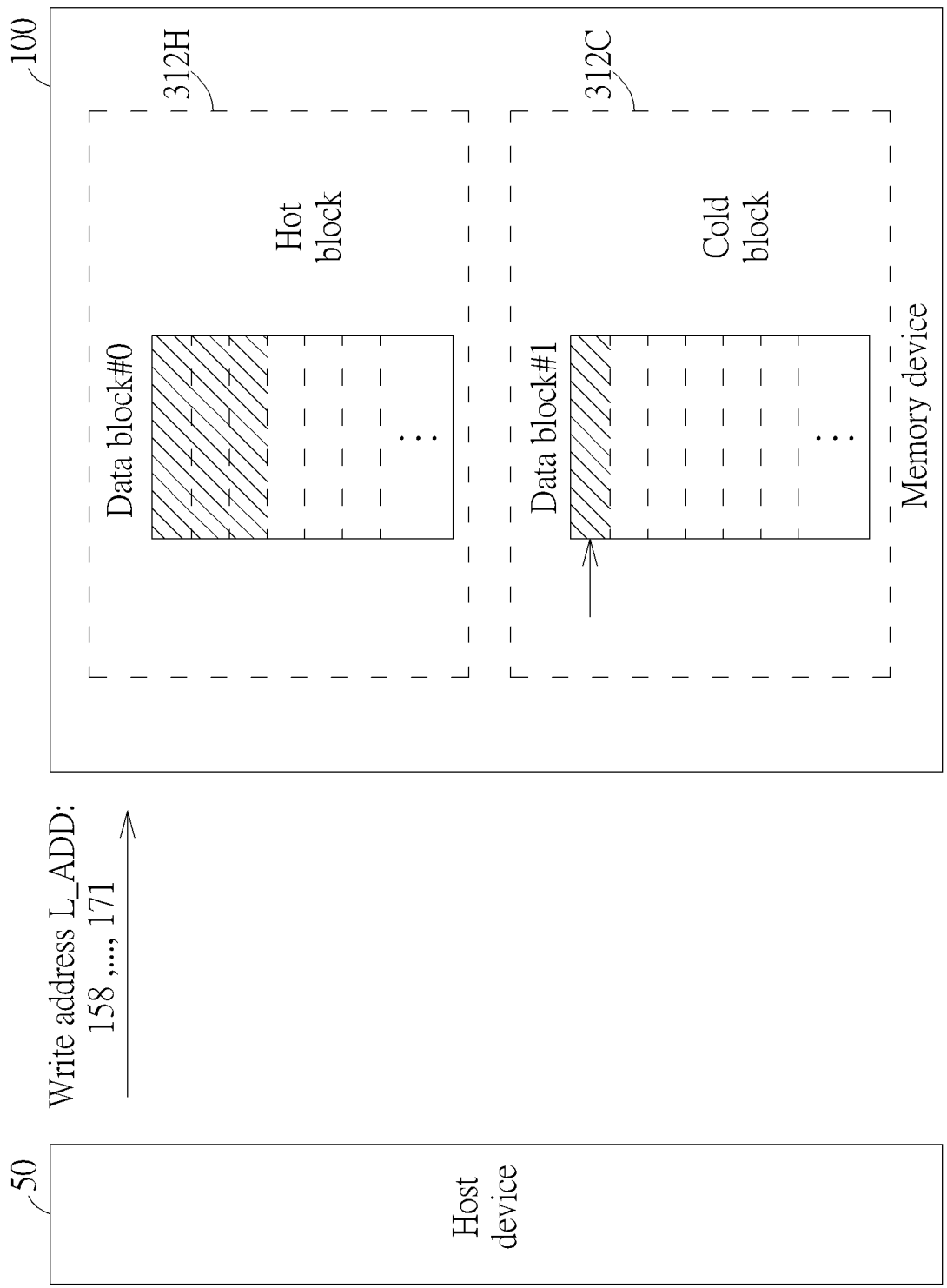
FIG. 6 is a diagram illustrating an example of writing hot data into one or more cold blocks.

FIG. 6 illustrates an example of writing hot data into one or more cold blocks 312C. It is assumed that the write address (e.g., the logical address L_ADD) comprises a set of logical addresses {158, ... , 171}. The memory controller 110 determines a set of data to be written in the set of logical addresses {158, ... , 171} belongs to the hot data group (or hot data) according to the data classification information (e.g. the respective access counts {AC}, the average value AC_avg, etc. of the set of logical addresses {158, ... , 171}). The set of data can be used as an example of the first data. In response to the first data belonging to the hot data group such as the hot data shown in FIG. 3, the memory controller 110 writes the first data into the first blank block such as the block 314C, to use the first blank block as a data block of the first data, such as a data block #1.

Figure 7:
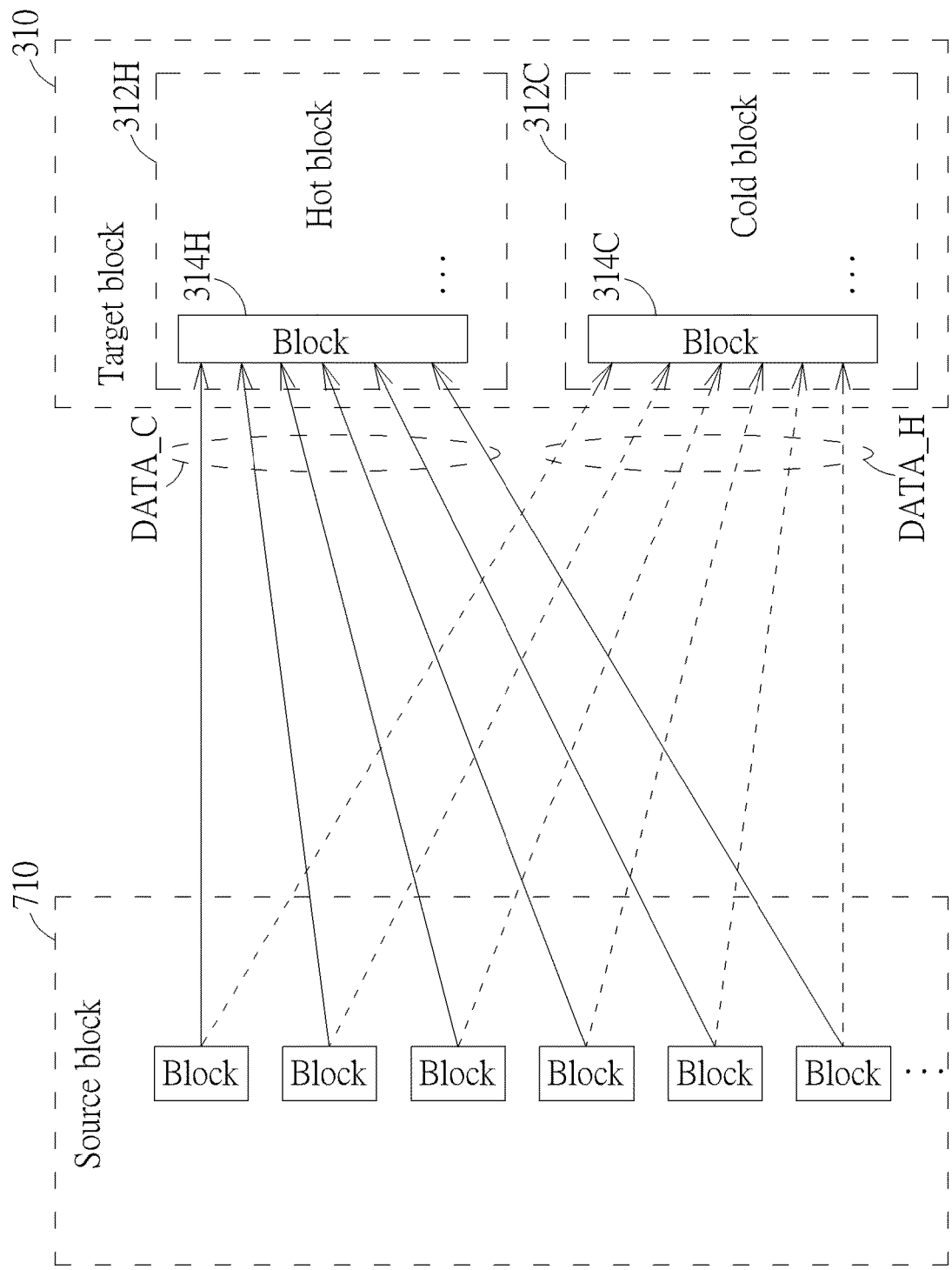
FIG. 7 is a diagram illustrating an example of applying the data classification and write control scheme shown in FIG. 3 to a garbage collection (GC) process.

FIG. 7 illustrates an example of applying the data classification and write control scheme shown in FIG. 3 to a garbage collection (GC) process. According to the embodiment, each of the target blocks 310 (e.g., the target block and the other target block) is related to a destination block regarding the GC process, and the multiple sets of data to be written (e.g., the first data and the second data) are derived from at least one source block (e.g. one or more source blocks) of the GC process such as a source block 710. It is assumed that the first data is originally stored in a first used block, and the second data is originally stored in a second used block. For example, the plurality of blocks comprise a plurality of used blocks, such as blocks shown in the left half of FIG. 7, and the plurality of used blocks comprises the first used block and the second used block, such as two of the blocks shown in the left half of FIG. 7. In this situation, in response to the first data in the first used block belonging to the hot data group such as the hot data DATA_H, the memory controller 110 selects the first used block from the plurality of used blocks as a source block regarding the GC process; and in response to the second data in the second used block belonging to the cold data group such as the cold data DATA_C, the memory controller 110 selects the second used block from the plurality of used blocks as another source block regarding the GC process. However, the invention is not limited thereto. Taking a specific block of the blocks in the left half of FIG. 7 as an example, the first data and the second data can be originally stored in a same used block, such as the specific block of the blocks. In this case, the first used block and the second used block can be replaced with the same used block, and the source block and the other source block can be replaced with the same source Block. Generally speaking, the first data and the second data can be originally stored in at least one used block. For example, the first data and the second data can be stored in the same used block. For another example, the first data and the second data can be respectively stored in the first used block and the second used block. In response to the first data and the second data in the at least one used block respectively belonging to the hot data group and the cold data group, the memory controller 110 may select the at least one used block from the plurality of used blocks as at least one source block regarding the GC process, wherein the plurality of used blocks comprise the at least one used block.

During the GC process, the memory controller 110 can check whether a plurality of available blank pages in the destination block have been fully written. More particularly, in response to the plurality of available blank pages in the destination block being completely written, the memory controller 110 may close the destination block, and update the L2P table 400 regarding written data in the destination block, for further access of the written data, wherein the written data may comprise one of the first data and the second data. For example, when the destination block represents the first blank block such as the block 314C, the written data may comprise the first data. For another example, when the destination block represents the second blank block such as the block 314H, the written data may comprise the second data.

According to some embodiments, after step S18 is performed, regarding the data in step S18, the memory controller 110 may update a physical-to-logical address mapping table (which is called P2L table for short) for use by one or more recovery mechanisms of the memory controller 110, wherein the P2L table can be set in the target block corresponding to the classification result in step S18, but the invention is not limited thereto. For example, the target block may represent the first blank block, and after writing the first data into the first blank block, the memory controller 110 may update the P2L table in the first blank block regarding the first data. For another example, the target block may represent the second blank block, and after writing the second data into the second blank block, the memory controller 110 may update the P2L table in the second blank block regarding the second data.

According to some embodiments, the at least one characteristic parameter in step S16 may comprise an access count parameter PARA_AC, which can indicate a cumulative access count of a logical address L_ADD of the data in step S16, such as the access count AC, wherein the memory controller 110 can determine the access count AC of the logical address L_ADD to generate the access count parameter PARA_AC carrying the access count AC. For example, in the case that the data in step S16 represents the first data such as DATA(1), the at least one characteristic parameter regarding the first data may comprise an access count parameter PARA_AC(1), which may indicate a cumulative access count of logical address L_ADD (1) of the first data DATA(1), such as an access count AC(1). For another example, in the case that the data in step S16 represents the second data such as DATA(2), the at least one characteristic parameter regarding the second data may comprise an access count parameter PARA_AC(2), which may indicate a cumulative access count of logical address L_ADD(2) of the second data DATA(2), such as an access count AC(2). For brevity, similar content in the embodiments will not be repeated here.

According to some embodiments, the at least one characteristic parameter in step S16 may comprise a type parameter PARA_TYPE, which may indicate a data type of the data in step S16, such as a type TYPE, wherein the memory controller 110 may determine the type TYPE of the data to generate the type parameter PARA_TYPE carrying the type TYPE. For example, in the case that the data in step S16 represents the first data such as DATA(1), the at least one characteristic parameter regarding the first data may comprise a type parameter PARA_TYPE(1), which may indicate a data type of the first data DATA(1), such as a file system type TYPE_FILE_SYSTEM, that is, file system information. For another example, in the case that the data in step S16 represents the second data such as DATA(2), the at least one characteristic parameter regarding the second data may comprise a type parameter PARA_TYPE(2), which may indicate a data type of the second data DATA(2), such as a multimedia type TYPE_MULTIMEDIA, that is, multimedia data. For brevity, similar content in the embodiments will not be repeated here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing block management regarding a non-volatile (NV) memory, the method being applicable to a controller of a memory device, the memory device comprising the controller and the NV memory, the NV memory comprising at least one NV memory element, the at least one non-volatile memory element comprising a plurality of blocks, the method comprising:

determining whether a first blank block belongs to a cold block group or a hot block group according to an erase count of the first blank block, wherein the cold block group and the hot block group respectively correspond to a first range of erase counts and a second range of erase counts, and any value in the second range of erase counts is greater than any value in the first range of erase counts;

in response to the first blank block belonging to the cold block group, selecting the first blank block from a plurality of blank blocks as a target block, for performing data writing, wherein the plurality of blocks comprise the plurality of blank blocks, and the plurality of blank blocks comprise the first blank block;

determining whether first data belongs to a cold data group or a hot data group according to at least one characteristic parameter regarding the first data to be written, wherein the cold data group and the hot data group respectively correspond to a first range of access probability and a second range of access probability, and any value in the second range of access probability is greater than any value in the first range of access probability; and in response to the first data belonging to the hot data group, writing the first data into the first blank block to use the first blank block as a data block of the first data.

2. The method of claim 1, wherein the first data is received from a host device, and an operation of writing the first data is performed according to a write command received from the host device.

3. The method of claim 2, further comprising:
updating a logical-to-physical address mapping table regarding first written data in the first blank block, for further access of the first written data, wherein the first written data comprises the first data.

4. The method of claim 1, wherein the target block is a destination block regarding a garbage collection (GC) process, and the first data is originally stored in a first used block; and the method further comprises:
in response to the first data in the first used block belonging to the hot data group, selecting the first used block from a plurality of used blocks as a source block regarding the garbage collection process, wherein the plurality of blocks comprise the plurality of used blocks, and the plurality of used blocks comprise the first used block.

5. The method of claim 4, further comprising:
during the garbage collection process, checking whether a plurality of available blank pages in the destination block have been fully written; and
in response to the plurality of available blank pages in the destination block being fully written, closing the destination block, and updating a logical-to-physical address mapping table regarding a written data in the destination block, for further access of the written data, wherein the written data comprises the first data.

6. The method of claim 1, further comprising:
after writing the first data into the first blank block, updating a physical-to-logical address mapping table in the first blank block regarding the first data.

7. The method of claim 1, which further comprises:
determining whether other data belongs to the cold data group or the hot data group according to at least one characteristic parameter regarding the other data; and
in response to the other data belonging to the hot data group, writing the other data into the first blank block to use the first blank block as a data block of the other data.

8. The method of claim 1, wherein the at least one characteristic parameter regarding the first data comprises an access count parameter, and the access count parameter indicates a cumulative access count of a logical address of the first data.

9. The method of claim 1, wherein the at least one characteristic parameter regarding the first data comprises a type parameter, and the type parameter indicates a data type of the first data.

10. The method of claim 1, further comprising:
determining whether a second blank block belongs to a cold block group or a hot block group according to an erase count of the second blank block;
in response to the second blank block belonging to the hot block group, selecting the second blank block from the plurality of blank blocks as another target block, for performing data writing, wherein the plurality of blank blocks comprise the second blank block;

determining whether second data belongs to a cold data group or a hot data group according to at least one characteristic parameter regarding the second data to be written; and in response to the second data belonging to the cold data group, writing the second data into the second blank block to use the second blank block as a data block of the second data.

11. The method of claim 10, wherein the first data and the second data are received from a host device, an operation of writing the first data is performed according to a write command received from the host device, and an operation of writing the second data is performed according to another write command received from the host device.

12. The method of claim 11, further comprising:
updating a logical-to-physical address mapping table regarding first written data in the first blank block, for further access of the first written data, wherein the first written data comprises the first data; and
updating the logical-to-physical address mapping table regarding second written data in the second blank block, for further access of the second written data, wherein the second written data comprises the second data.

13. The method of claim 10, wherein each of the target block and the other target block is a destination block regarding a garbage collection (GC) process, the first data is originally stored in a first used block, and the second data is originally stored in a second used block; and the method further comprises:
in response to the first data in the first used block belonging to the hot data group, selecting the first used block from a plurality of used blocks as a source block regarding the garbage collection process, wherein the plurality of blocks comprise the plurality of used blocks, and the plurality of used blocks comprise the first used block; and
in response to the second data in the second used block belonging to the cold data group, selecting the second used block from the plurality of used blocks as another source block regarding the garbage collection process, wherein the plurality of used blocks comprise the second used block.

14. The method of claim 10, wherein each of the target block and the other target block is a destination block regarding a garbage collection (GC) process, the first data and the second data are originally stored in at least one used block; and the method further comprises:
in response to the first data and the second data in the at least one used block respectively belonging to the hot data group and the cold data group, selecting the at least one used block from a plurality of used blocks as at least one source block regarding the garbage collection process, wherein the plurality of blocks comprise the plurality of used blocks, and the plurality of used blocks comprise the at least one used block.

15. The method of claim 14, further comprising:
during the garbage collection process, checking whether a plurality of available blank pages in the destination block have been fully written; and
in response to the plurality of available blank pages in the destination block being fully written, closing the destination block, and updating a logical-to-physical address mapping table regarding written data in the destination block, for further access of the written data, wherein the written data comprises one of the first data and the second data.

16. The method of claim 10, further comprising:
after writing the second data into the second blank block, updating a physical-to-logical address mapping table in the second blank block regarding the second data.

17. The method of claim 10, further comprising:
determining whether other data belongs to the cold data group or the hot data group according to at least one characteristic parameter regarding the other data; and
in response to the other data belonging to the cold data group, writing the other data into the second blank block to use the second blank block as a data block of the other data.

18. The method of claim 10, wherein the at least one characteristic parameter regarding the second data comprises an access count parameter, and the access count parameter indicates a cumulative access count of a logical address of the second data.

19. The method of claim 1, wherein the at least one characteristic parameter regarding the second data comprises a type parameter, and the type parameter indicates a data type of the second data.

20. A memory device, comprising:
a non-volatile (NV) memory, arranged to store information, wherein the NV memory comprises at least one NV memory element, and the at least one NV memory element comprises a plurality of blocks; and
a controller, coupled to the NV memory for controlling operations of the memory device, wherein the controller comprises:
a processing circuit, arranged to control the controller according to a plurality of host commands from a host device, to allow the host device to access the NV memory through the controller;
wherein:
the controller determines whether a first blank block belongs to a cold block group or a hot block group according to an erase count of the first blank block, where the cold block group and the hot block group respectively correspond to a first range of erase counts and a second range of erase counts, and any value in the second range of erase counts is greater than any value in the first range of erase counts;
in response to the first blank block belonging to the cold block group, the controller selects the first blank block from a plurality of blank blocks as a target block, for performing data writing, where the plurality of blocks comprise the plurality of blank blocks, and the plurality of blank blocks comprise the first blank block;
the controller determines whether first data belongs to a cold data group or a hot data group according to at least one characteristic parameter regarding the first data to be written, where the cold data group and the hot data group respectively correspond to a first range of access probability and a second range of access probability, and any value in the second range of access probability is greater than any value in the first range of access probability; and
in response to the first data belonging to the hot data group, the controller writes the first data into the first blank block to use the first blank block as a data block of the first data.

21. The memory device of claim 20, wherein the controller determines whether a second blank block belongs to the cold block group or the hot block group according to an erase count of the second blank block; in response to the second blank block belonging to the hot block group, the controller selects the second blank block from the plurality of blank blocks as another target block, for performing data writing, where the plurality of blank blocks comprise the second blank block; the controller determines whether second data belongs to the cold data group or the hot data group according to at least one characteristic parameter regarding the second data to be written; and in response to the second data belonging to the cold data group, the controller writes the second data into the second blank block to use the second blank block as a data block of the second data.

22. An electronic device, comprising the memory device of claim 20, and further comprising:
the host device, coupled to the memory device, wherein the host device comprises:
at least one processor, arranged to control operations of the host device; and
a power supply circuit, coupled to the at least one processor, arranged to provide power to the at least one processor and the memory device;
wherein the memory device provides the host device with storage space.

23. A controller of a memory device, the memory device comprising the controller and a non-volatile (NV) memory, the NV memory comprising at least one NV memory element, the at least one NV memory device comprising a plurality of blocks, the controller comprising:
a processing circuit, arranged to control the controller according to a plurality of host commands from a host device, to allow the host device to access the NV memory through the controller;
wherein:
the controller determines whether a first blank block belongs to a cold block group or a hot block group according to an erase count of the first blank block, where the cold block group and the hot block group respectively correspond to a first range of erase counts and a second range of erase counts, and any value in the second range of erase counts is greater than any value in the first range of erase counts;
in response to the first blank block belonging to the cold block group, the controller selects the first blank block from a plurality of blank blocks as a target block, for performing data writing, where the plurality of blocks comprise the plurality of blank blocks, and the plurality of blank blocks comprise the first blank block;
the controller determines whether first data belongs to a cold data group or a hot data group according to at least one characteristic parameter regarding the first data to be written, where the cold data group and the hot data group respectively correspond to a first range of access probability and a second range of access probability, and any value in the second range of access probability is greater than any value in the first range of access probability; and
in response to the first data belonging to the hot data group, the controller writes the first data into the first blank block to use the first blank block as a data block of the first data.

\* \* \* \* \*